United States Patent

Younger

[11] 3,870,341
[45] Mar. 11, 1975

[54] STRADDLE TRAILER HITCH
[76] Inventor: Dwen R. Younger, 2181 D Lone Oak Ave., Napa, Calif. 94558
[22] Filed: July 29, 1974
[21] Appl. No.: 492,570

Related U.S. Application Data
[63] Continuation of Ser. No. 392,612, Aug. 29, 1973, abandoned, which is a continuation-in-part of Ser. No. 237,471, March 23, 1972, abandoned.

[52] U.S. Cl. .............................. 280/423 R, 280/496
[51] Int. Cl. ............................................. B62d 53/06
[58] Field of Search ............ 280/423 R, 495; 296/23

[56] References Cited
UNITED STATES PATENTS

| | | | |
|---|---|---|---|
| 2,628,106 | 2/1953 | Sturivold | 280/423 B |
| 3,383,119 | 5/1968 | Carroll | 280/423 R X |
| 3,390,896 | 7/1968 | Philapy | 280/423 R |
| 3,698,740 | 10/1972 | Chisholm | 280/423 B X |
| 3,722,917 | 3/1973 | Mims et. al. | 280/495 X |
| 3,770,297 | 11/1973 | Quick et al. | 280/423 R |

FOREIGN PATENTS OR APPLICATIONS

| 811,601 | 4/1959 | Great Britain | 280/423 |
|---|---|---|---|

Primary Examiner—Leo Friaglia
Assistant Examiner—R. Schrecengost
Attorney, Agent, or Firm—Townsend and Townsend

[57] ABSTRACT

A tow beam straddle trailer hitch that includes an inverted U-shaped yoke adapted to straddle the body on the horizontally elongated chassis frame of a tow vehicle at a point intermediate the front and rear ends of said chassis to provide a pair of legs at opposite sides of said body extending downwardly to points adjacent said chassis frame at their lower ends, and horizontally elongated strut members secured to the upper portion of said yoke and adapted to extend rearwardly therefrom and downwardly to the rear end of said chassis frame rearwardly of said rear wheels when said yoke is in a position straddling said body, and means for releasably securing the lower ends of said yoke, and the rear ends of said strut members to said chassis frame for supporting said yoke and truss members in towing position spaced from said body, and a tow hitch element centrally between the forward ends of said truss members rigid therewith and rigid relative to said yoke supported in a position intermediate said front and rear ends of said chassis when said yoke and truss members are in said towing position.

22 Claims, 35 Drawing Figures

PATENTED MAR 11 1975 3,870,341

STRADDLE TRAILER HITCH

This is a continuation in part of application Ser. No. 392,612 filed Aug. 29, 1973 as a continuation in part of the parent application Ser. No. 237,471 filed Mar. 23, 1972 and now both abandoned.

SUMMARY

Conventionally hitched car-trailer combinations provide for connecting the draw bar at the forward end of the trailer with a hitch element connected with the rear end of the chassis of the tow car or vehicle. With this arrangement, the combination can jackknife if turned too quickly, or in case of emergency maneuvers, gusty winds, etc.; or the towed vehicle may yaw or fishtail, particularly where the tow and towed vehicle may be swung laterally during cruising speed.

These occurrences are not merely objectionable, but may result in serious injury to the vehicles and fatalities to the occupants.

The jackknifing is virtually eliminated by providing the hitch connection between the tow vehicle and the towed vehicle centrally between the front and rear ends of the chassis of the tow vehicle, such as a sedan, and centrally above the body between its sides. This arrangement also substantially eliminates the yaw or fishtailing even under those conditions where the tow and towed vehicles are quickly swung off the pavement or road onto the shoulder and is then quickly swung back again.

Heretofore efforts to provide a hitch connection of the type above described employed a ball and socket arrangement, such as used in conventional trailer hitches. Said ball has been either secured to the top of the tow vehicles, or secured on a member or members extending transversely across the top and secured to the top or clamped or secured to the guttering on the body above the doors. In structure of this kind, the hitch connection being secured to the roof of the body, the latter will take all of the strains transmitted to the tow car by the towed vehicle. Trailers designed for such a connection have bodies undercut on their forward portions for receiving the rear portion of the tow vehicle, and this results in an elevated tongue that includes bunk or storage space, with the socket portion of the ball and socket hitch at the forward end of such tongue.

In the event of sudden or crash stops with the above arrangement, particularly where excess weight is in the tongue of the towed vehicle, or where the brakes on the towed vehicle or trailer are inadequate, or in the event of a collision, the body of the tow vehicle will usually be damaged by the tongue with the likelihood of injury to the occupants.

Also, heretofore, special and costly hitch connections have been required where the hitch element on the tow car is on structure that, in turn, is secured to the top or guttering of the tow vehicle, and special and costly jacks have been connected with and carried by the trailer for supporting the trailer level longitudinally of the latter when disconnected from the tow vehicle.

One of the objects of this invention is the provision of means for connecting a trailer to the chassis frame of the tow vehicle free from a direct attachment to the body of the tow vehicle, with the hitch attachment positioned over the body in a position centrally between the lateral sides of the tow vehicle and at a point substantially midway between its front and rear ends of the chassis.

Another object of this invention is the provision of a straddle trailer hitch assembly adapted to be removably secured to and supported on the chassis of a conventional two-door or four-door sedan in a position spaced from the body and free from interference with the doors of the sedan, and which assembly includes a hitch element connectable with the tongue of the trailer at a location spaced above the body centrally between its sides and approximately midway between the front and rear ends of the chassis, whereby the hazard of jackknifing and yawing or fishtailing are substantially eliminated under conditions where heretofore they have been inevitable.

A still further object of the invention is the provision of a straddle trailer hitch assembly having the structure and arrangement mentioned in the hereinbefore objects, that includes means for supporting the assembly including the tongue of the trailer with the latter hitched to said assembly in a position for removal of the tow vehicle from the trailer and said assembly and for reattachment of the trailer to the tow vehicle and assembly, when the tow vehicle has been disconnected from and moved away from the trailer and assembly, and has later returned for reattachment.

An added object of the invention is the provision of a frame that is connected with a tongue on the trailer by a conventional ball and socket hitch, and which frame is adapted to be releasably secured to and supported on the chassis frame of a tow vehicle having a closed body thereon with a roof, for supporting said ball and socket hitch spaced above the top of said roof in a towing postion approximately centrally between the lateral sides of said body and at a point intermediate the front and rear ends of said frame, and which frame carries supporting elements including jacks, independently of said trailer, for supporting said trailer longitudinally level on the frame when the frame is disconnected from the tow car, and for also supporting said frame at the proper height for securing said tow car to the frame.

Another object of the invention is the provision of a straddle hitch assembly for connecting a trailer to the chassis frame of a conventional passenger tow vehicle having a body with a top or roof, free from direct connection with said body and with the hitch connection between the trailer tongue and the tow vehicle secure on said frame in a towing position positioned above said roof at a point intermediate the front and rear ends of said chassis frame, and substantially centrally between the lateral sides of said body, and which assembly materially contributes to the safety of the passenger and reduction of injury to the tow vehicle in the event of an accident or turn-over of the tow vehicle.

Other objects and advantages will appear in the description and drawings.

DETAILED DESCRIPTION

Figure 1:
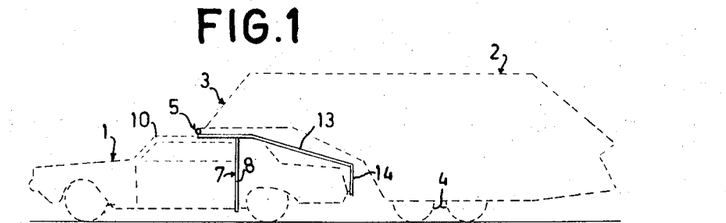
FIG. 1 is a simplified side elevational view of a trailer connected with a two-door sedan by the straddle hitch assembly, the sedan and trailer being indicated in broken lines.
Figure 2:
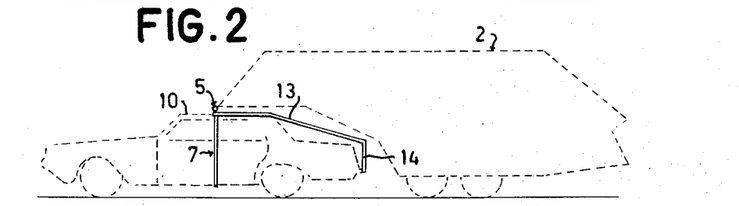
FIG. 2 is a view similar to that of FIG. 1 in which a trailer is connected with a four-door sedan.
Figure 3:
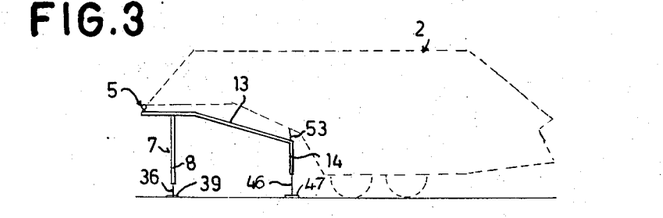
FIG. 3 is a side elevational, semi-diagrammatic view of the straddle trailer hitch assembly independent of a tow vehicle in a position connected with a trailer and supporting the trailer longitudinally level.

FIGS. 1, 2 and 3 show side elevational views of the invention in semi-diagrammatic form. In FIG. 1, a conventional two-door sedan is indicated at 1, and is connected with a trailer 2. The trailer indicated is of the type having a forwardly extending tongue 3 that may include bunk and storage space, and which tongue extends forwardly over the top of the tow vehicle, generally as shown in U.S. Pat. No. 3,381,119 of May 14, 1968, although the type of tongue and the specific type of ball and socket hitch may vary.

Trailer 2 is supported on ground wheels 4, and the forward end of the tongue has a conventional socket member at 5 (FIG. 1) for releasable connection with a ball that is on the tow vehicle.

Figure 6:
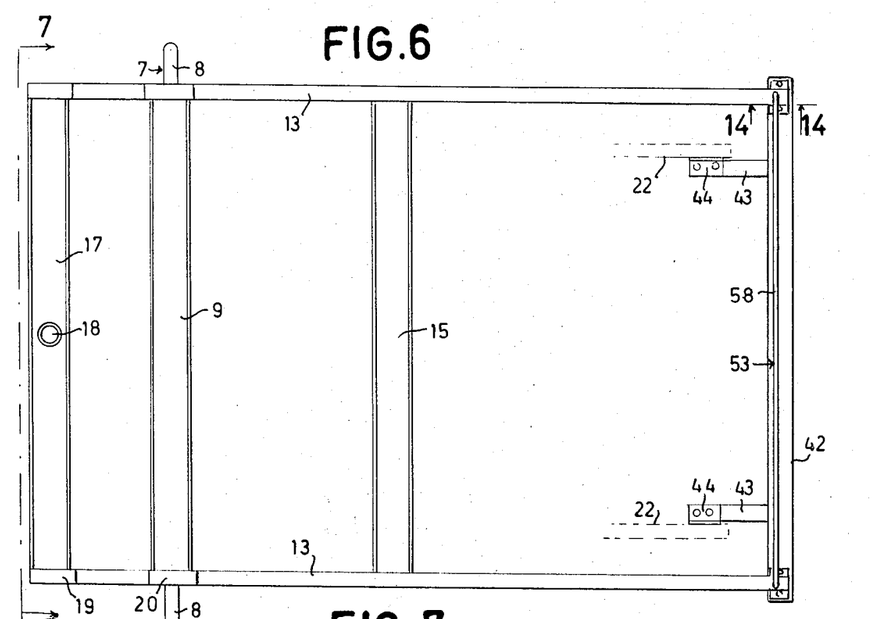
FIG. 6 is a top plan view of the straddle trailer hitch assembly alone, with the rear end portions of the chassis frame indicated in broken lines.

In the present invention, the straddle trailer hitch assembly, which will hereafter be merely referred to as the "Hitch assembly", comprises an inverted, U-shaped yoke generally designated 7, (FIGS. 1, 4, 6) which yoke has legs 8 depending from and rigid with the ends of a rigid cross member 9 (FIG. 6).

This yoke straddles the body 10 of the tow vehicle with a leg at each lateral side of the body and the cross member 9 extending across the top or roof of the body. When in position on the tow vehicle, the legs 8 and cross member 9 are respectively spaced from the sides and top of the body 10 and may curve to generally follow the contour of said sides and top, with the lower end portions of the legs 8 adjacent opposite sides of the chassis frame of the tow vehicle and extending convergently in a downward direction.

Where the words "forward", "forwardly", "rear", "rearwardly" and words of similar meaning are employed, they are used with reference to the normal forward movement of the tow vehicle and trailer. Thus the tow vehicle is forwardly of the trailer.

A pair of horizontally elongated struts 13 (FIGS. 1, 5, 6) extend rearwardly from yoke 7, their forward end portions being secured to said yoke at points adjacent the ends of the cross member 9. Said struts 13 may extend slantingly downwardly in a rearward direction, spaced from body 10 terminating in vertically extending rear end portions 14 (FIGS. 1, 4) that, in turn, have their lower terminating ends adjacent the ends of the rear cross member of the chassis frame, when the tow beam assembly is in operative position on the tow vehicle.

Struts 13 are connected by a stiffener strut 15 (FIG. 6) which is spaced between the portions 14 and the cross member 9 of yoke 7, and which stiffener strut may be in the form of a junior beam for contributing to the rigidity of the assembly.

In the case of a two-door sedan or a four-door sedan (FIGS. 1, 2) or other type of body, such as a station wagon, for example, the legs 8 of the yoke are along the sides of the body in positions adjacent the rear edges of the side doors where they will not interfere with opening and closing of the doors. In any event the ball of the hitch connection is preferably supported in a position approximately midway between the front and rear ends of the chassis.

Figure 4:
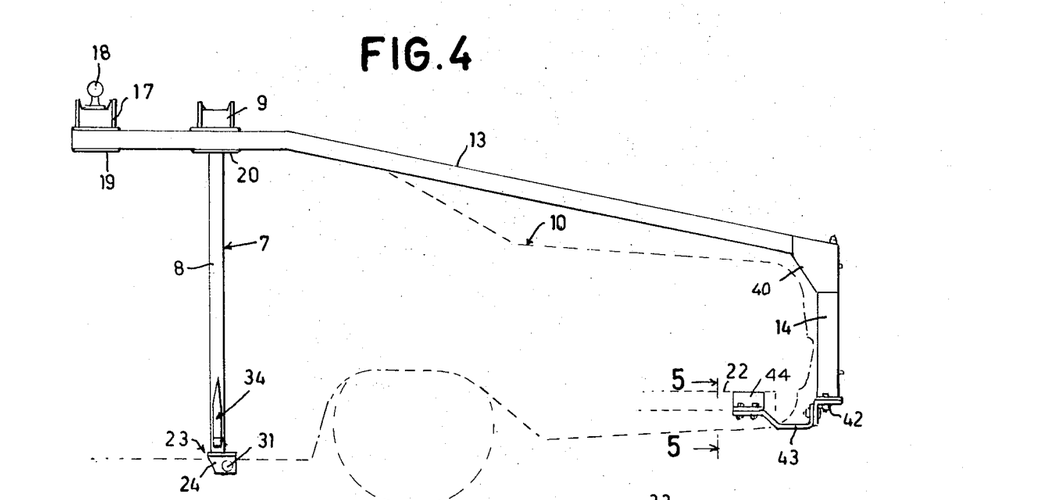
FIG. 4 is an enlarged side elevational view of the straddle hitch assembly of FIG. 1 with fragments of the tow vehicle and trailer and the rear end of the chassis frame indicated in broken lines, but with the releasable connection between the rear end of the assembly and rear end of the chassis shown in full line. The yoke arms shown in full line are in their position on a two-door sedan.
Figure 5:
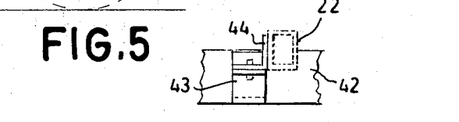
FIG. 5 is an enlarged, fragmentary cross-sectional view along line 5—5 strutsupported FIG. 4.
Figure 7:
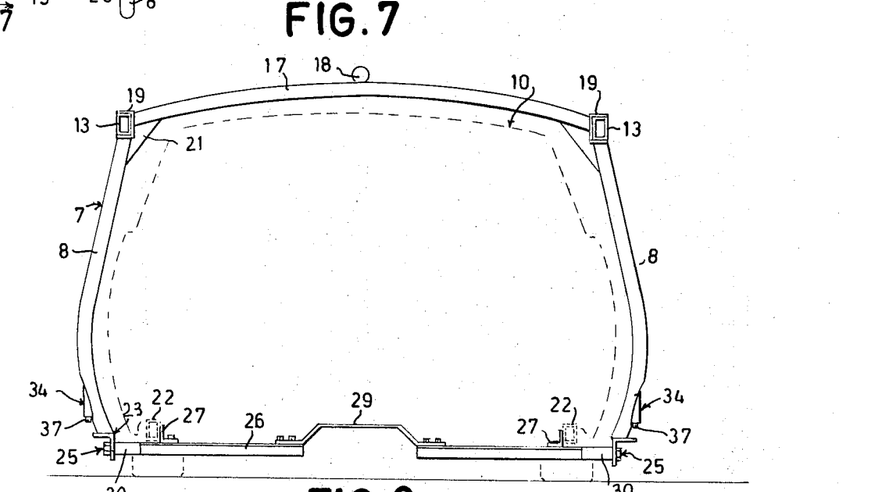
FIG. 7 is an end view of the straddle trailer hitch as seen from line 7—7 of FIG. 6 with the outline of the body of the tow car and the side frame members of the chassis indicated in broken lines.
Figure 8:
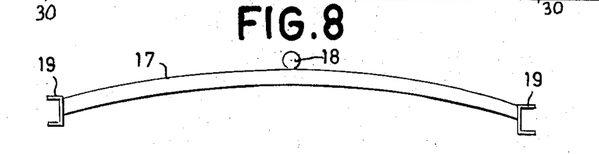
FIG. 8 is an elevational view of the horizontally extending cross bar at the forward end of the straddle trailer hitch assembly separate from the rest of the assembly.

In the case of a two-door sedan, yoke 7 (FIG. 4) is secured to struts 13 at points rearwardly of their forward ends, so that the legs of the yoke will be positioned rearwardly of the doors on body 10. A cross member 17 (FIGS. 4, 7, 8) will be secured at its ends to the forward ends of struts 13, and said member 17 will carry a ball 18 secured to said cross member 17 for supporting said ball at a point approximately centrally between the front and rear ends of the chassis and substantially centrally between the forward ends of struts 13. Cross member 17 is of channel shape in cross-sectional contour, and the ball 18 is on an upstanding stem having a base rigidly secured to the web of member 17 centrally between its ends (FIGS. 4, 8).

Figures 10, 11, 12, 13, 14, 15, 16:
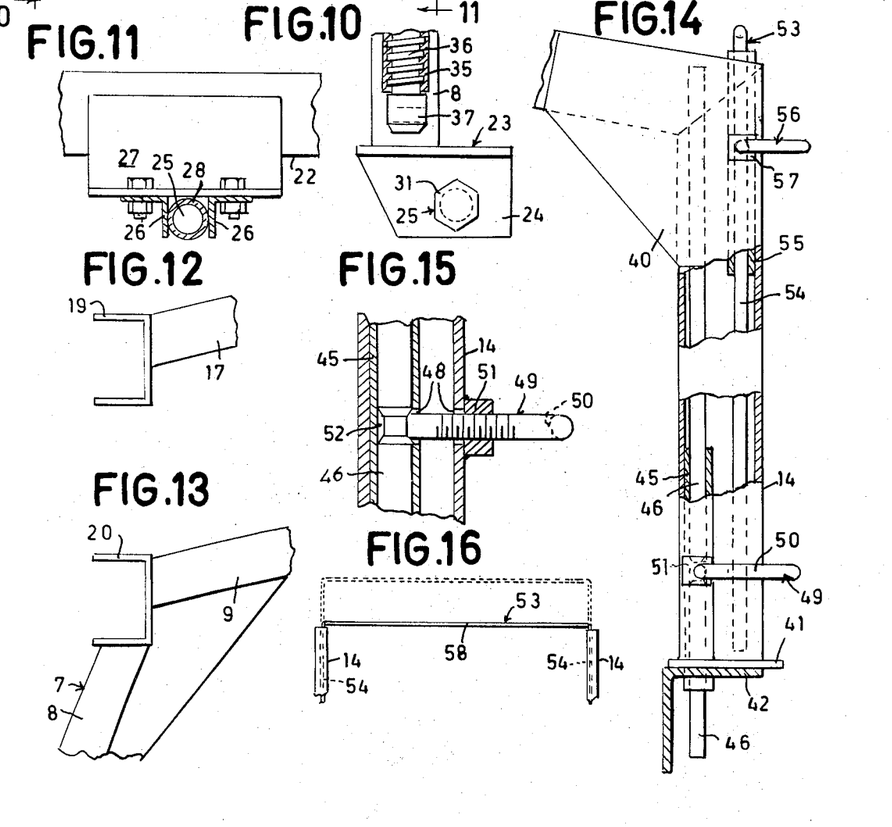
FIG. 10 is a fragmentary cross-sectional view as seen from line 10—10 of FIG. 9.
FIG. 11 is a cross-sectional view at line 11—11 of FIG. 9.
FIG. 12 is an enlarged, fragmentary elevational view of the structure at one of the ends of the tow beam arch for a two-door sedan for receiving a strut member.
FIG. 13 is a view similar to that of FIG. 12 at one of the ends of the tow beam portion of the yoke of FIG. 7 for receiving a strut member.
FIG. 14 is an enlarged part sectional, part elevational view of the vertically retractable and extensible supports in the vertical tubular rear end portion of each side strut for supporting the straddle trailer assembly longitudinally level relative the ground when the assembly is disconnected from the vehicle, as seen in FIG. 3.
FIG. 15 is an enlarged fragmentary cross-sectional view of a portion of the structure in FIG. 14 for holding each of the lower supporting legs retracted when a trailer is being towed.
FIG. 16 is a fragmentary, greatly reduced, elevational view of the stabilizer cross bar for stabilizing the frame and trailer when the frame is disconnected from the tow vehicle.
Figure 17:
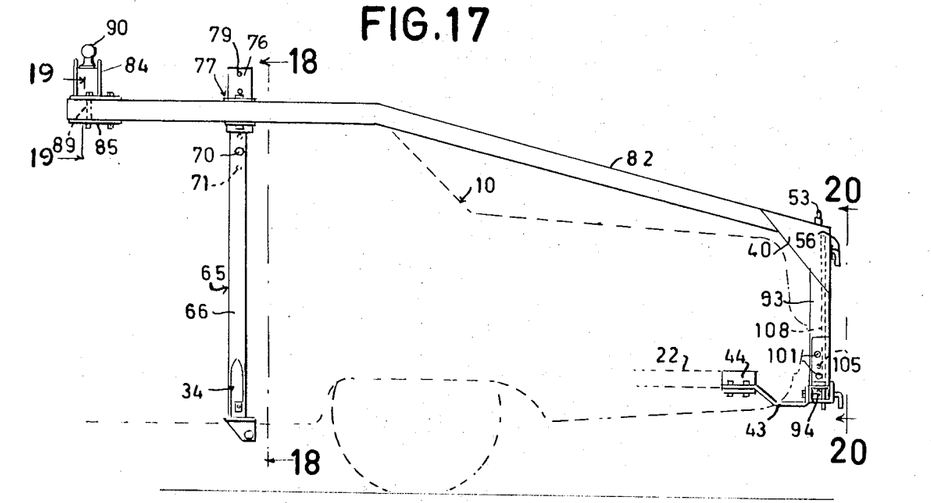
FIG. 17 is a side elevational view of a modification of the straddle trailer hitch assembly of FIGS. 1–16, which view is similar to that of FIG. 4, with portions broken away and in cross section.

The ends of cross member 17 have horizontally disposed, laterally outwardly opening channel sections 19. Struts 13, which are of box contruction, are fitted into said channel sections through their open sides, and welded to said sections (FIGS. 7, 12).

Yoke 7 is spaced rearwardly of cross member 17 (FIG. 4) and channel sections 20 (FIG. 13) corresponding to sections 19 are welded to the cross member 9 and the upper ends of legs 8 at the ends of said member 9. Gusset plates 21 are welded to cross member 9 at its ends and to the upper ends of legs 8, contributing to the rigidity of the yoke and assembly.

Where the hitch assembly is for a four-door sedan indicated at 1' (FIG. 2), or for a tow vehicle and the legs of the yoke could be positioned substantially centrally between the ends of the chassis frame, the cross member 17 could be eliminated, and the ball 18 may be secured on the cross bar of the yoke itself, as shown in FIG. 2. In this instance, the forward ends of the strut members 13 could terminate at the yoke. But in either case, the hitch connection would be on a cross member that is rigidly connected with the yoke, the only difference being that the cross member on the assembly for a two-door sedan is rigidly connected with yoke by portions of the truss members 13 while in a four-door sedan, the cross member carrying the hitch connection is part of the yoke.

The side frame members of the chassis frame are indicated at 22 (FIGS. 7, 9) in broken lines. Below the lower end of each leg 8 is an angle piece 23. One horizontal side of each angle piece is welded to the lower end of each leg and the other side 24 of each piece 23 extends vertically downwardly and is formed with an opening. The angle pieces 23 are at opposite sides of the chassis frame, and the openings in the sides 24 of said pieces are in axial alignment. Horizontally extending axially aligned bolts 25 extend through the openings in sides 23 from the outer sides of the chassis.

Pairs of parallel angle strips 26 (FIG. 12) are bolted to brackets 27 (FIG. 9) that, in turn, are welded to the side chassis frame members 22, with one pair of said strips secured to each side chassis frame member. Strips 26 (FIG. 11) extend at right angles to frame members 22, and the strips of said pairs are in longitudinal alignment providing a downwardly opening channel below each of the side chassis frame members 22. Elongated, horizontally extending tubular bolt guides 28 are positioned in said channels, and are welded to the strips 26.

Bolt guides 28 are in longitudinal alignment, and a nut 28' is welded to the inner terminal end of each guide, and extensions of the angle strips 26 extend toward each other from the chassis frame members. The adjacent ends of the pair of strips 26 are connected by a member 29 (FIG. 7). This member may be offset upwardly or downwardly intermediate its ends to extend over or under any portions of the chassis that might otherwise interfere therewith, or in the absence of any structure that would so interfere, the angle strips 26 could extend continuously from side to side of the chassis.

Thus the supporting means, rigidly secured to the side chassis frame members for supporting the forward portion of the hitch assembly preferably extends from side to side of the chassis whether continuously or with an intermediate connection.

The bolts 25 extend through tubular spacers 30 that are positioned between the angle pieces 23 and the tubular bolt guides 28, and threadedly through the nuts 28'. Said spacers enable rigidly securing the legs of the yoke 7 to chassis side frame 22 that may vary in horizontal spacing. Heads 31 of bolts 25 engage the outer sides of depending flanges 24 on angle pieces 23 for tightening the yoke to the chassis frame.

The arched contour of the legs 8 and upper cross members 9 and 17 contribute to the rigidity of the assembly when secured on the chassis.

Legs 8 of the yoke may be cylindrical, and tubular, and integrally secured to the lower end portion of each leg is a vertically extendable and retractable jack, generally designated 34. Each jack comprises an internally threaded vertically extended tube or sleeve 35 that extends into, and is welded to, each leg 8 of yoke 7. A vertically disposed jack screw 36 (FIGS. 9, 10) in threaded engagement with the threads in each tube 35 extends into the lower open end of each tube.

A head 37 is rigid on the lower end of each jack screw, each head being formed with a horizontally disposed opening 38 (FIG. 9) for removably receiving a turning bar of any suitable length for rotating the jack screw 36 to adjust the height of the assembly for registering the chassis supported yoke securing means with the yoke for securing the yoke with the chassis after the tow vehicle has been disconnected, and is reconnected, and for extending and retracting the jack screws at any time. In extending the jack screws for supporting the forward end of the assembly, it is preferable that a flat block 39 of any suitable material be placed on the ground for engagement with the head 37.

By the foregoing structure, the jacks are an integral part of the straddle trailer hitch assembly, independent of the tow vehicle and trailer, and are quickly operable for extending to assembly-supporting position. Also said jacks are disposed at all limits within the longitudinally projected confines of the outline of the assembly at its maximum width where they are protected against injury to the jacks or objects that might be struck by them if they projected outwardly of the maximum width of the assembly. The lower ends of the jack screws, when in upwardly retracted position do not project below the lower ends of legs 8 of the yoke and each angle piece 23 supports the jack offset to one side of bolt 25 (FIG. 10) to enable bolts 25 to be released without interfering with the jack screw where the latter is extended downwardly to support the forward end of the assembly.

At the rear end of the assembly, the downwardly extending rear end portions 14 of the struts 13 may be of tubular box structure the same as struts 13, in downward extension of the rear ends of the struts (FIGS. 4, 14). Gussets 40 at the junctures between the struts 13 and the downwardly extending portions 14 function as braces to provide added rigidity to the assembly.

The lower end of each of said portions 14 is welded to a horizontal plate 41 (FIG. 14) that, in turn, is bolted to each end of the horizontally disposed upper side of a horizontally extending angle strip 42 that is positioned rearwardly of the rear ends of the chassis side frame members 22 (FIG. 4). A bracket 43 (FIGS. 4, 5) is bolted to the vertically disposed side of each opposite end portion of angle strip 42, and each bracket extends forwardly and is bolted at its forward end to an angle piece 44 (FIGS. 4, 6) that is welded to the rear end portion of each chassis side frame member 22.

Within the lower portion of each of the rear end portions 14 is a vertically extending tubular sleeve 45 (FIG. 14) that projects at its lower end through an opening in plate 41 and the upper flange of the angle strip 42. This sleeve is welded to said angle strip and is plug welded to the portion 14 of the strut 13 at one of the inner corners of the latter. A cylindrical, vertical post 46 fits within each sleeve 45 and is vertically reciprocable therein from an upwardly retracted position as indicated in FIG. 14, in which the lower end of the post projects slightly below the lower open end of the sleeve but above the lower edge of the vertical flange of the angle strip 42, to a downwardly extended position in which the lower end of the post reaches the ground, or a block 47 (FIG. 3) that is on the ground. When retracted posts 46 may extend to the upper ends of the strut portions 14. When downwardly extended to assembly-supporting position, the upper end portions will be held in the vertically elongated sleeves 45.

Axially aligned openings 48 (FIG. 15) are formed in one side of each sleeve 45 and in the strut portion 14, for a clamping screw 49 having a right angle handle 50 on its outer end outside the portion 14 for rotating the screw 49 to tighten it against post 46 for holding said post in retracted and extended positions. A nut 51 is welded to each portion 14 at the opening for the screw 49 for threaded engagement with the threads on the latter. Preferably a radially outwardly opening groove 52 (FIG. 15) is formed in each post 46 for receiving the end of screw 49 when the post is in retracted position to insure against the latter working downwardly when the trailer is being towed, and when in this tightened position, the handle 50 preferably extends laterally to the tightening side on downward movement to automatically hold the screw against loosening from vibration.

Before releasing the assembly from the tow vehicle, the posts 46 are extended downwardly into engagement with the ground, or preferably against a block 47 positioned on the ground, and the posts are then locked in this position.

As is apparent from FIG. 3, were the tow vehicle released and removed when the jack screw and posts were extended to the ground, the downward force of the tongue on the forward portion of the assembly would swing the rear end of the assembly upwardly about the lower ends of the jack screws, and this swinging would be inevitable were there any forward thrust by the tongue against the assembly.

To stabilize the frame and trailer in the positions shown in FIG. 3, an inverted U-shaped stabilizer 53 (FIGS. 16) is provided. Each of the legs 54 of the stabilizer extends downwardly through the open upper ends of a tubular sleeve 55 (FIG. 14) that extends downwardly into each of the vertical rear strut portions 14 in the same manner as the sleeves 44 extend upwardly into said portions from their lower ends. These sleeves are welded to said portions 14, projecting through openings in the upper ends of the latter, and a locking screw 56 corresponding to each of the locking screws 49 extends through openings in a side of the sleeve 55 and portion and a threaded nut 57 for releasably locking the legs when extended upwardly and when retracted. The cross piece 58 of the bar 53 will engage the underside of the tongue 3 when extended upwardly, thereby stabilizing the assembly against being tipped forwardly and upwardly under any forward or downward force from the tongue or trailer. When the legs are retracted, the bar 58 will function as a tie bar to contribute to the rigidity of the assembly.

The modifications shown in FIGS. 17–22 accomplish the same results as the structure shown in FIGS. 1–16 and in the same manner, except that the assembly is adapted to be adjusted for tow vehicles of different widths and heights, and the same numerals will be used for identifying parts that structurally correspong to parts shown in FIGS. 1–16.

The yoke generally designated 65 straddles the body 10 and has legs 66 and a cross bar generally designated 67 (FIG. 18) extending across the body at the upper ends of said legs.

Said legs are tubular as is the cross bar 67, but the cross bar is vertically adjustable to different heights relative to the legs 66. The main body of the cross bar 67, centrally between its ends, has a tubular sleeve 68 welded thereto at each of its ends, which sleeve has an open end facing generally toward the adjacent upper terminal end of each leg 66. A tubular elbow 69 has its opposite end portions respectively telescopically extending into the open adjacent end of each leg 65 and into the open end of sleeve 68 at each end of the cross bar.

Bolt 70 secures the one end of each elbow 69 to a leg 66 at different degrees of extension into the leg and openings 71 (FIG. 17) are formed in the portion of the elbow extending into said leg for bolt 70 at each height.

Bolts 72 extend through aligned openings in the ends of sleeve 68 and in the telescopically received upper arms of elbows 69. Other openings 73 in said arms are provided at suitable points to secure the elbows in said sleeves at different lateral extensions of the elbows relative to the sleeve. This telescopic fitting of the arms of the elbows 69 in the upper ends of legs 66 and the end portions of sleeve 68, together with the positioning of spacers 30 of different lengths in the securing means at the lower ends of legs 66 enables securing the legs 66 to the chassis 22 different distances apart, and to enable supporting the cross bar 67 at the upper end of the yoke at different heights.

Figures 18, 19, 20, 21, 22:
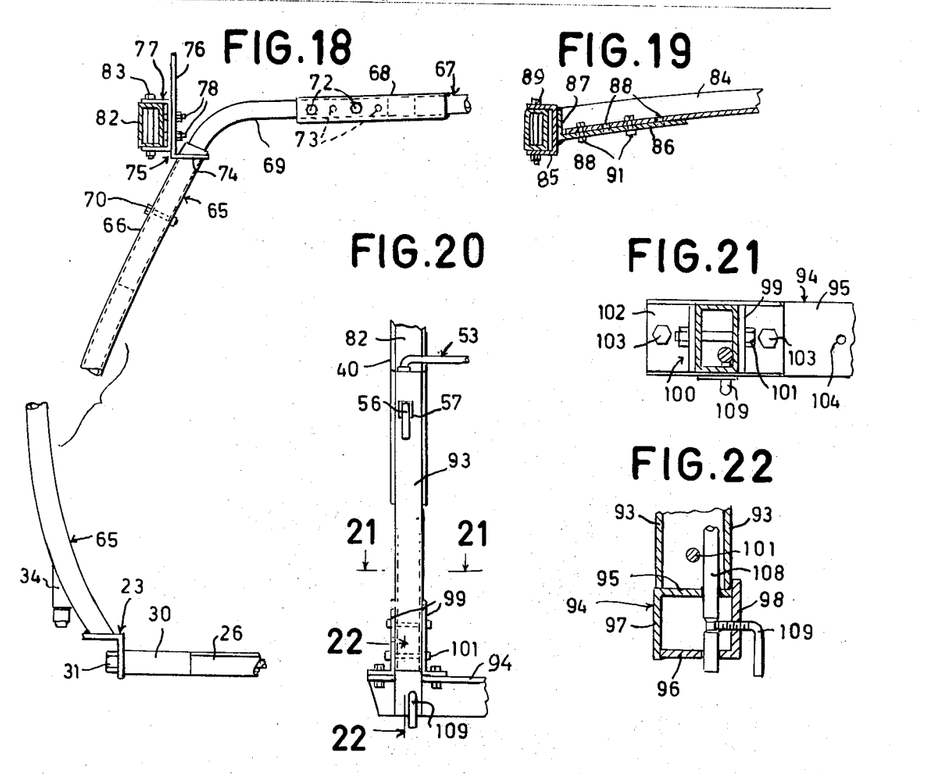
FIG. 18 is an enlarged, fragmentary, cross-sectional view of the near portion of the assembly of FIG. 17 as seen from line 18—18 of FIG. 17, said view being broken in height to accommodate the sheet.
FIG. 19 is an enlarged, fragmentary, cross-sectional view of the near portion of the structure shown in FIG. 17 as seen from line 19—19 of FIG. 17.
FIG. 20 is an enlarged, fragmentary elevational view of the near portion of the assembly of FIG. 17 as seen from line 20—20 of FIG. 17.
FIG. 21 is an enlarged, cross-sectional view along line 21—21 of FIG. 20.
FIG. 22 is an enlarged, cross-sectional view along line 22—22 of FIG. 20.

The upper end of each leg 66 extends through an opening in the horizontally disposed side 74 of an angle strip 75 (FIG. 18), to which angle strip said upper end is welded. The other side 76 of each angle strip 75 extends vertically upwardly. A horizontally disposed laterally outwardly opening channel piece 77 is secured by bolts 78 to the vertical side 76 of each angle piece that is on the upper end of each leg 66. Said vertical side 76 projects upwardly above each channel piece and is formed with one or more openings 79 (FIG. 17) for bolting the channel strips at different elevations relative to the legs 66 by bolts 78 (FIG. 18).

Horizontally extending box struts 82 (FIGS. 17–18), that substantially correspond to box struts 13 previously described, are adapted to fit between the upper and lower sides of the channel pieces 77, and a vertical bolt 83 extends through each strut and each channel strip for bolting the struts to the channel pieces. Thus the yoke 65 is rigidly connected with the struts adjacent the upper ends of legs 66.

The forward end portions of said struts 82 may be connected by a channel cross bar 84 that substantially corresponds to cross bar 17. As seen in FIG. 19, cross bar 84 has a channel piece 85 corresponding to each channel piece 77 which is adjustably secured on each end of the cross bar 84 for positioning the channel strip at different degrees of extension from the ends of said cross bar. A strip 86 is bolted to the horizontally disposed web of the cross bar 84 at each of its outer end portions, and each strip 86 has an upturned outer end 87 that is welded to the vertical web or back of each channel piece 85. The web of cross bar 84 is formed with holes 88 to enable securing the strips 86 at different degrees of extension outwardly of the ends of the cross bar by bolts 91. The forward ends of the struts 82 are fitted between the upper and lower sides of the channel strips 85, and are bolted in position within said channel pieces 85 by bolts 89 (FIG. 19).

The cross bar 84 carries the ball 90 for connection with the socket portion of the hitch that is at the forward end of the tongue on the trailer. This ball could obviously be secured to the cross bar 67 of the yoke in the case of a four-door sedan or in the event the yoke 65 could directly support the ball in a position substantially midway between the ends of the chassis.

The vertically downwardly extending rear end portions 93 of struts 82 are similar to the portions 14 of struts 13, and extend downwardly to the horizontally disposed transversely extending rear cross member 94. The member 94 is an angle strip substantially corresponding to the rear angle strip 94 of FIG. 6. Angle pieces are welded to the ends of angle strip 94 (FIG. 22) to provide box-like end portions having top walls 95, opposed front and rear walls 97, 98 and bottom walls 96.

The angle strip 94 is spaced rearwardly of the rear end of chassis frame 22 (FIG. 17) and is removably secured to said frame by brackets 43 and angle pieces 44 that are the same as used in FIG. 6 to secure the transverse angle strip 42 to the chassis frame. Front wall 97 of each box-like structure at each end of the angle strip 94 corresponds to the vertical side of said angle strip and the top wall 95 is the horizontal upper side of said strip.

The lower ends of the vertical rear end portions 93 of struts 82 (FIG. 21) are each bolted to and between a pair of upstanding flanges 99 of a pair of angle pieces 100 by bolts 101 (FIG. 17) and the lower horizontal sides 102 of each angle piece 100 is bolted to the upper side 95 of the transverse angle strip 94 by bolts 103 (FIG. 21). Added holes 104 (FIG. 21) may be provided in said side 95 to provide for adjustment of the rear ends of the struts 82 different distances apart. Also added holes 105 in the end portions 95 provide for supporting said portions at different heights above the chassis 22.

The foregoing structure enables struts 82 including cross bars 67, 68 to be adjusted as to horizontal spacing and heights for bodies 10 of different widths and heights.

The rear stabilizer 53 (FIG. 20) is supported for vertical movement to engage the underside of the tongue of the trailer when the tow vehicle is to be disconnected from the trailer. A manually actuatable screw 56 is provided for each leg of the stabilizer to releasably secure the latter at the desired height.

In FIG. 22 it is seen that a downwardly extending vertically elongated leg 108, corresponding to each leg 46 in FIG. 14 is positioned within each portion 93 of each strut 82. This leg is extensible downwardly the same as legs 46, but instead of extending into a sleeve in portion 93, it extends through vertically aligned openings in the walls 95, 96 (FIG. 22) and a locking screw 109 threadedly extends through wall 98 into releasable engagement with the leg 108 for holding the latter in extended position and in retracted position.

In operation, both the assembly of FIGS. 1–16 and of 16–22 are connected with the trailer and remain connected with the latter when the tow car is separated from the trailer, and in each instance, the stresses and strain incident to towing the trailer are taken by the chassis of the tow vehicle, and the hitch connection between the tow vehicle and the trailer is above the body of the former and at a point intermediate the front and rear ends of the chassis. The assemblies afford protection to the tow vehicle in the event of a turn-over and the jack and supports for each assembly are carried by each assembly.

In the modified form shown in FIGS. 23–30, a yoke generally designated 117 straddles the body of the tow car or vehicle 118 (FIGS. 23, 24) at a point intermediate the ends of the chassis of said vehicle. The yoke includes a horizontally extending, upwardly arched cross member 119 having vertically downwardly extending legs 120 at its ends.

Figure 23:
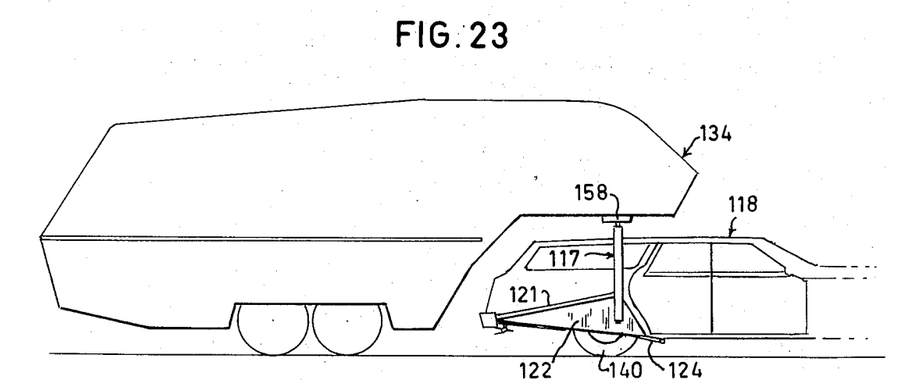
FIG. 23 is a semi-schematic side elevational view of a trailer with a modified straddle hitch connecting the trailer with a tow vehicle.

Struts 121 are rigidly connected to legs 120 at points spaced between the upper and lower ends of legs 120, and extend rearwardly and downwardly from said legs. Said struts are preferably at a level that is intermediate the upper side of the tow vehicle and the bottom of the latter when the frame of the hitch assembly is in towing position connected with the tow vehicle (FIG. 23). This is one of the specific features that distinguishes the modified form of the invention from that of FIGS. 1–4.

A horizontally elongated plate 122 of generally triangular outline is welded to each strut 121 and to each leg 120. The base edge of each plate extends horizontally forwardly and downwardly from the rear end of each strut past the lower end of each leg to a point forwardly of each leg (FIG. 23).

Flanges 123 (FIGS. 24, 26) on and along the lower edges of plates 122 extend inwardly toward each other. An elongated, horizontally extending angle strip 124 (FIG. 26) has a horizontally, outwardly extending leg 125 that is rigidly secured to each flange 123. The other leg 126 of each angle strip 124 extends vertically downwardly and is formed with an opening at its forward end for anchor bolt 127 (FIG. 26) of an anchor assembly 128 that is bolted to the chassis 130 (FIG. 25) of the automobile 118 by bolts 131.

Figure 26:
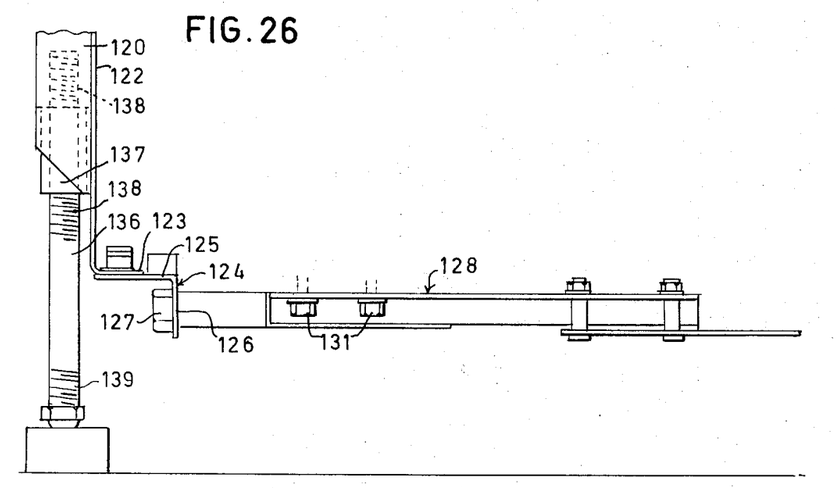
FIG. 26 is an enlarged, fragmentary front view of the lower portion of one leg of the yoke of the hitch frame and one anchor assembly for connecting the hitch frame with the tow vehicle, as seen from line 26—26 of FIG. 25, but with the parts right side up.
Figure 27:
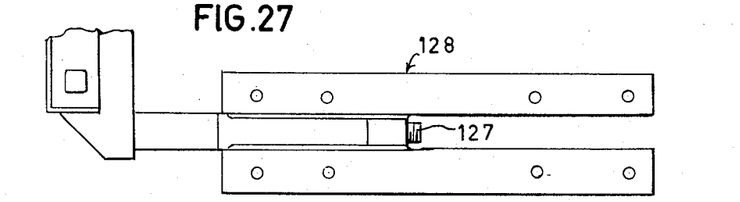
FIG. 27 is a top plan view of the anchor assembly shown in FIG. 26.

The assembly 128 shown in FIGS. 26, 27 is one of two identical assemblies, each secured to one of the side members of chassis 130 (FIG. 25) for bolting thereto by bolts 131.

Figure 9:
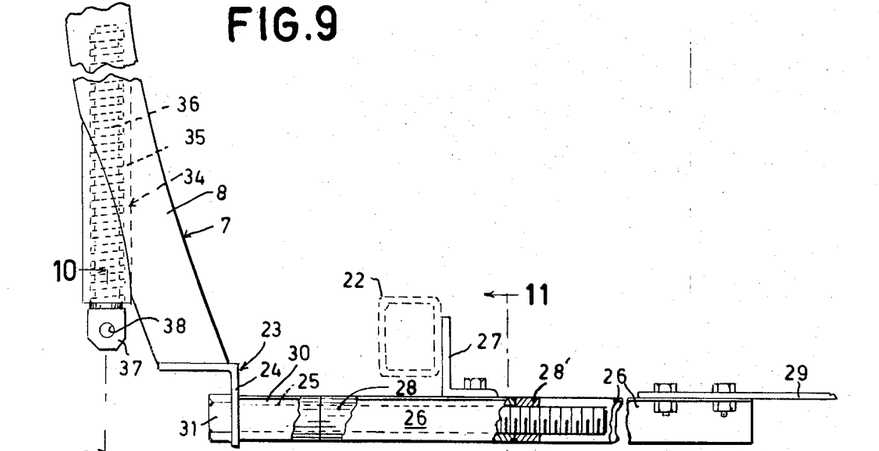
FIG. 9 is an enlarged fragmentary view of one of the jacks and of the securing means for the forward end of the straddle trailer hitch assembly at one side of the chassis frame, the latter being indicated in broken lines and parts of the securing means being broken away and in section to show concealed parts.
Figure 24:
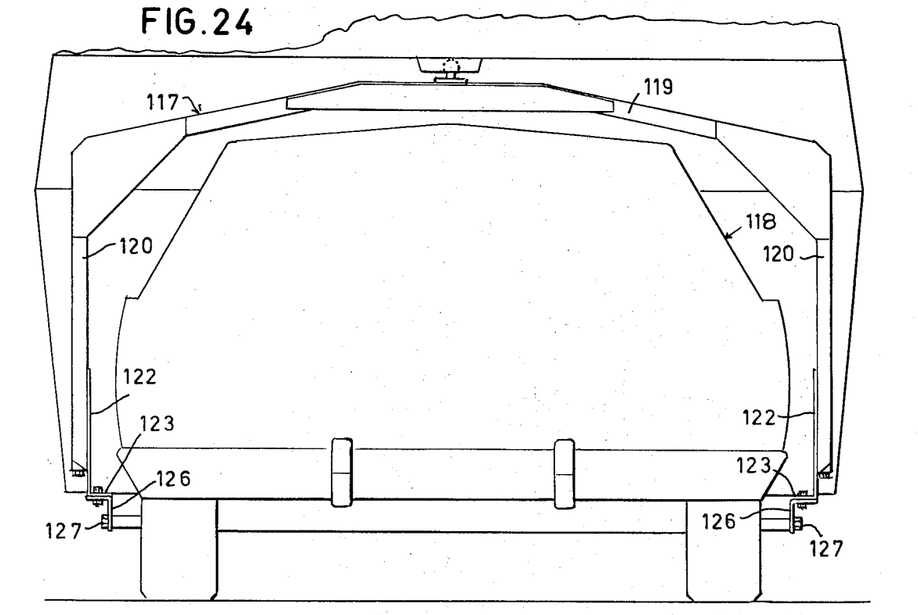
FIG. 24 is an enlarged front end view of the trailer hitch of FIG. 23 in position connecting the tow vehicle with a trailer, the tow vehicle and trailer being merely indicated in outline, with an upper portion of the trailer removed.
Figure 25:
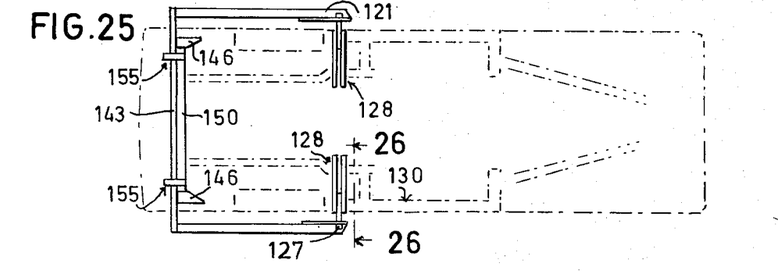
FIG. 25 is a greatly reduced bottom plan view showing the chassis of the tow vehicle in dot-dash lines with the portions of the hitch connections shown in full line.

The anchor bolts 127 correspond to bolts 25, 31 of FIG. 9, and each assembly 128 corresponds to the assembly associated with each of the bolts 25, 31. However, the connection between each anchor bolt 127 and the maid hitch frame is such that the yoke 117 is positioned rearwardly of the rear side doors of the towing vehicle 118, irrespective of the type of passenger vehicle, while the assembly 128 extends below the chassis and forwardly of the rear wheels 132 (FIGS. 23, 24).

Each leg 120 may be of box form in horizontal cross sectional contour, with a vertical jack screw 136 therein. An internally threaded vertically extending sleeve 137 is within and welded to each leg 120 at the lower end of the latter, and each jack screw 136 is formed with threads 138 at its upper end engageable with the threads within each sleeve 137, while threads 139 on the lower end of each screw are also engageable with the threads in each sleeve. The portion of each screw intermediate the upper and lower sets of threads 138, 139 is unthreaded and will clear the threads in the sleeve. Thus when the jack is extended (FIG. 26) to support the hitch frame the upper threads 138 engage the threads in the sleeve, and the jack may be quickly retracted when the hitch frame is unbolted from the tow vehicle so the lower threads 139 will engage the threads in the sleeve to hold the jack screws in retracted position. Obviously, any suitable lock washers 140 or similar means may be employed to releasably lock the jack screws in elevated positions.

Each strut 121 may be of box form in cross sectional contour (FIG. 30) and the flange 123 on each plate 122 at its rear end is formed with an opening for upward passage of a vertically upwardly extending bolt 142 that is welded to each end of a rear, tubular cross bar 143. An upper nut 144 and a lower nut 145 on each bolt 142 are respectively positioned above and below each flange 123 to adjustably support the cross bar 143 at different levels relative to main hitch frame. Openings may readily be formed in flanges 123 to position the cross bar 143 different distances forwardly and rearwardly relative to said frame.

The cross bar 143 has a pair of forwardly projecting guide members 146 rigidly secured thereto. These members may be in the form of a pair of coplanar plates with their inner edges 147 that face each other, extending divergently relative to each other (FIG. 25, 28, 30) from points spaced rearwardly of bar 143. Edges 147' between said points and the bar 143 are preferably at a right angle to said bar.

A horizontally extending cross piece 150 of box form in cross sectional contour (FIGS. 28–30) is supported below and secured to rear end of the chassis frame 130 by means of angle members 151, one leg of each being bolted to the cross piece 150 by bolts 152 and the other bolted by bolts 153 to the rear end of each side frame of the chassis 130. The terminating ends of the cross piece 150 are substantially at the wide forward ends of the guide members 146 at edges 147'.

The angle members 151 are spaced from the terminal ends of cross piece 150 and a pair of sets of guide elements generally designated 155 are secured said cross piece adjacent the terminal ends of the latter.

Figure 28:
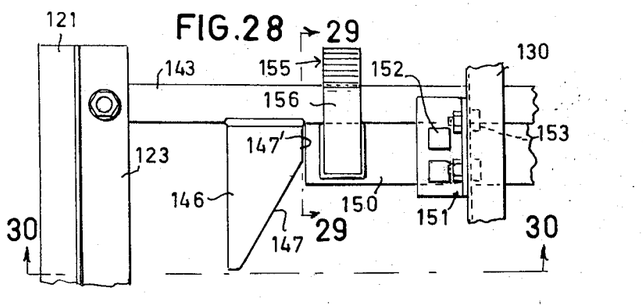
FIG. 28 is an enlarged, fragmentary top plan view of one side of the rear portion of the hitch frame showing guide elements on the tow vehicle and on the hitch frame in cooperative relation.

Each set of guide elements consists of an upper element 156 and a lower element 157. Said upper and lower elements are metal strips above and below the ends of said cross piece, each having one of its ends welded to the cross piece as indicated in FIG. 28.

Figure 29:
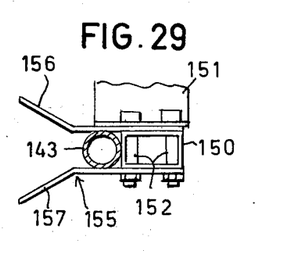
FIG. 29 is a cross-sectional view along line 29—29 of FIG. 28.
Figure 30:
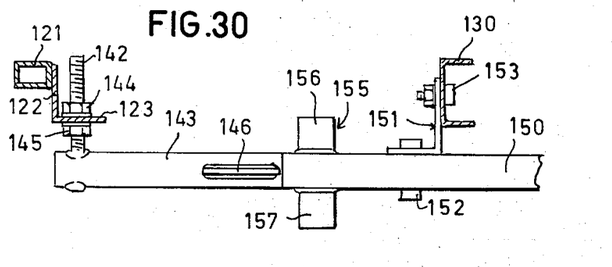
FIG. 30 is a cross-sectional view along line 30—30 of FIG. 28.

The strips of each set of elements project rearwardly from cross piece 150 and their end portions adjacent the cross piece being parallel and spaced vertically a distance at least equal to the thickness of the tubular cross bar 143, while their opposite end portions extend divergently vertically relative to each other in a rearward direction (FIG. 29).

Centrally between the ends of the cross member 119 of the yoke 117 is a conventional hitch connection generally designated 158 which includes a ball and socket coupling. The ball may be carried by the tongue 134 or by the cross member 119. In either case a hitch element of the connection is carried by the cross member 119.

In operation, to separate the tow vehicle from the trailer, the jacks 136 are lowered from their upper retracted position to support the trailer-load on the ground, instead of on the tow vehicle. The anchor bolts 127 are then removed and the tow vehicle is free to be driven away. The anchor bolts may be replaced after the separation to be readily accessible for reconnecting the trailer with the tow vehicle.

While the tow vehicle is connected with the trailer it is seen (FIG. 29) that the tubular cross bar 143 on the hitch assembly is positioned between the guide elements 153, 154 that are on the cross piece 150. Cross piece 150 is carried on the tow vehicle. And the guide plates or members 146 which are on the trailer hitch frame are at opposite ends of said cross piece 150. Thus the rear end of the trailer frame is positioned and held centrally between the sides of the towing vehicle at its rear end, and the tubular cross member is held at the proper height being between the guide elements 156, 157. This connection between the rear end of the tow vehicle and the trailer hitch may be said to be loose connection, rather than a rigid connection, hence it is only necessary to remove the two anchor bolts 127 to release the hitch frame from the tow vehicle.

To connect the tow vehicle with the trailer, the jacks 136 are actuated to bring the holes in the angle strips 124 to approximately travel level and the tow car is backed between legs 120 of the hitch frame until contact is made between the self centering, self engaging guide members and elements 146, 155.

The bolt-holes in the angle strips 124 and the matching openings in the ends of the cross bars 143 are then brought into registration and the anchor bolts 127 inserted to secure the forward end of the hitch frame to its tow vehicle. The jacks 136 are then retracted and locked in retracted position.

Figures 31, 32, 33, 34, 35:
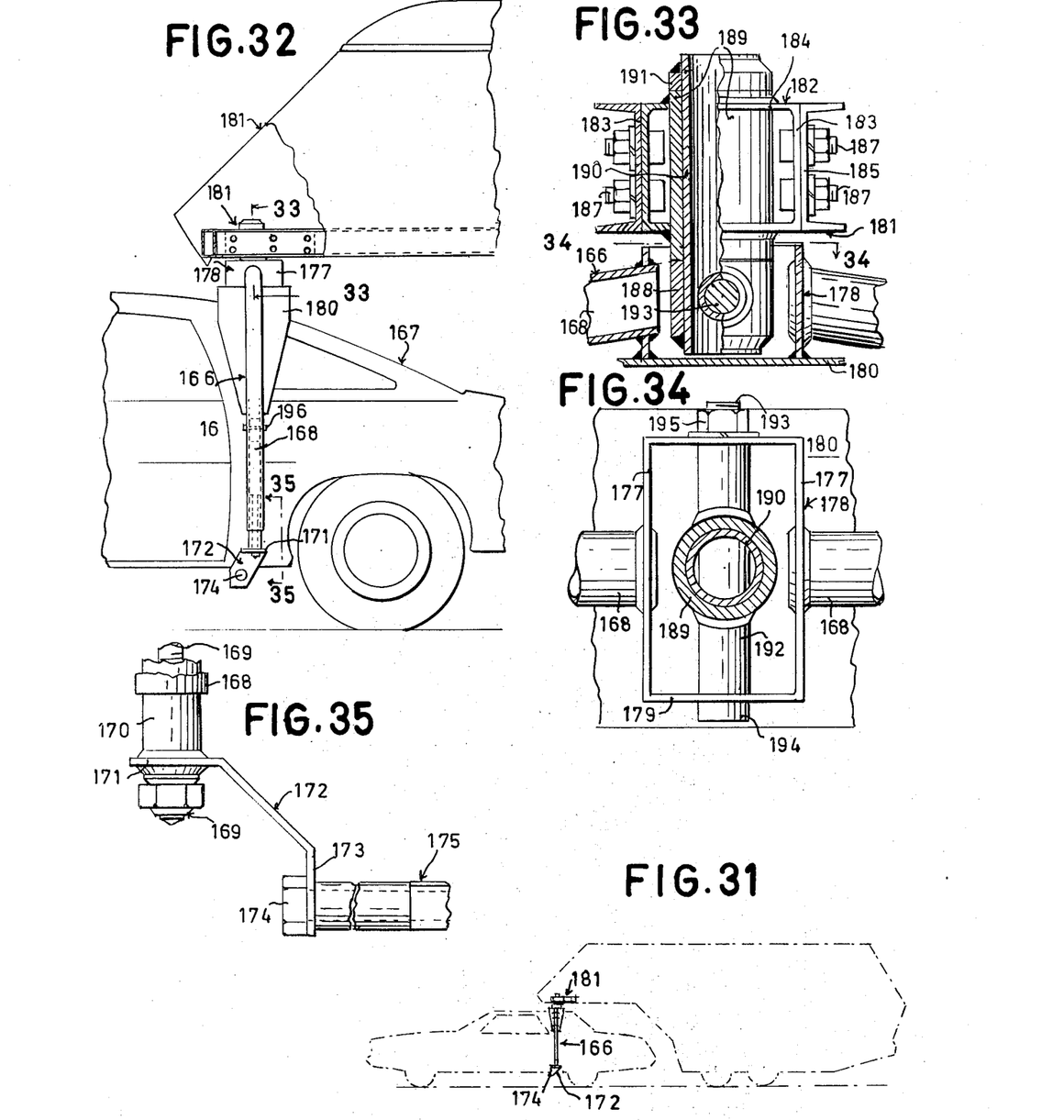
FIG. 31 is a reduced size elevational view of a further modification of the invention indicated in full line in operative position on a towing vehicle and connected to a towed vehicle of the type hereinbefore described, the towing and towed vehicles being shown in dot-dash lines.
FIG. 32 is an enlarged side elevational view of the trailer hitch of FIG. 31 in operative position, with portions of the towing and towed vehicles indicated in full lines.
FIG. 33 is an enlarged part elevational and part sectional view taken generally along line 33—33 of FIG. 32.
FIG. 34 is an enlarged cross-sectional view along line 34—34 of FIG. 33.
FIG. 35 is an enlarged fragmentary elevational view as seen from line 35—35 of FIG. 32.

In the mofication of FIGS. 32–34 the hitch element for the releasable connection with the tongue of the towed vehicle is seen to comprise a horizontal pivot 193 and a vertical pivot 190 positioned centrally between the ends of the cross member of the yoke. Both of these pivots are elongated and the pivot 193 restricts the rocking of the chassis in a vertical plane extending longitudinally of the latter to the anchor bolts at the lower ends of the legs of the yoke. The vertical pivot of the hitch element permits turning of the tow vehicle to change the direction of movement of the vehicles. The ball and socket connection is eliminated, as are the struts extending to the rear end of the chassis.

In FIGS. 31–35 an inverted U-shapped yoke generally designated 166 straddles the body of the tow vehicle and has vertically extending legs 168. Each leg 168 of the yoke has a vertically reciprocable jack screw 169 in its lower end portion. An internally threaded sleeve 170 secured within each leg has its threads in engagement with the external threads on screw 169; the structure and operation of each jack screw being substantially the same as that of the jack screws 136 in FIG. 26.

The lower end of each sleeve 170 is welded to a horizontal flange 171 on a bracket 172 (FIG. 35). Each bracket extends forwardly and downwardly from flange 171 and has a vertical flange 173 at its lower end through which an anchor bolt 174, corresponding to anchor bolt 127 in FIG. 26, extends into an anchor bolt assembly 175 that corresponds to anchor bolt assembly 128.

The legs 168 progressively curve toward each other in an upward direction, commencing at points intermediate their upper and lower ends. Their upper end portions extend over the top of the tow vehicle, when the yoke is on the latter, and have terminal upper end portions that extend through coaxial openings formed in two opposite vertical sidewalls 177 of a horizontally disposed rectangular box 178. Said terminal end portions are rigidly welded to said side walls 177 at each of the openings through which they extend. said rectangular box is elongated the direction of the lengths of said sides 177. The two end walls of the box 178 are designated 179.

Box 178 is supported on and welded to the upper surface of a metal strip 180 that is wider than the width of the box and that extends equal distances from the side walls 177 along the lower sides of the curved portions of legs 168, to which said portions are rigidly secured by any suitable means, such as welding. The width of the strip may progressively taper for equal distances, as seen in FIG. 32.

From the foregoing it is seen that the box 178, together with the strip 179, form the central portion of yoke 166, and said yoke is spaced from the body of the tow vehicle and is in substantially the same position as the yokes in the other forms of the invention.

The coupling between the trailer or towed vehicle and the tow vehicle is generally designated 181 (FIG. 32) and includes a box beam section 182 having vertical spaced opposed side walls 183 that are connected by top and bottom walls 184. said box beam is positioned between a pair of parallel, horizontally extending channel members 185, which pair is centrally between the sides of the trailer and its forwardly extending tongue. Said channel members are rigid with and extend longitudinally of said tongue along its lower side. The webs of members 185 face each other with their horizontal flanges extending away from each other. Bolts 187 secure the side walls of the box beam 182 against the webs of said members 185.

The top and bottom walls of the beam 182 are formed with coaxial openings through which the ends of a vertical tubular bearing 189 extend, and to which walls the bearing is welded.

Approximately centrally positioned within the box 178 is a relatively short, upright cylindrical body 188 that is in axial continuation of bearing 189, but separate from the latter.

A vertical tube 190 is rotatably fitted within and extends through bearing 189 and body 188. The lower terminal end of tube 190 is welded to the lower end of body 188, and a collar 191 is welded on the upper end of tube 190. The adjoining ends of bearing 189 and body 188 are in abutting relation, and the collar 191 is substantially against the upper end of the bearing.

The body 188 and the lower end portion of tube 190 that is within said body are formed with coaxial openings through which a horizontal tube 192 extends to the end walls of box 178. The tube 192 is welded to opposite sides of body 188 and a cylindrical bar 193 rotatably supports the tube 192, extending through the latter and through the end walls 179 of box 178. Bar 193 is in the form of a bolt having a head 194 on one end that engages the outer side of one of the end walls 179 while a nut 195 is on the other end outwardly of the other end wall 179.

The bolt 193 releasably connects the yoke 166 with the box beam assembly on the tongue of the trailer.

In operation, when the tow vehicle and the towed vehicle are connected, the yoke itself will remain stationary relative to the chassis of the tow vehicle, but rocking movement of one vehicle relative to the other during movement over a corduroy-like road surface is permitted about the axis of the anchor bolts 174.

The tilting movement of either vehicle relative to the other about their longitudinal axes occurs about the axis of bolt 193 at the top of the yoke, while changes in the forward or rearward directional movement take place about the vertical axis of the tube 190 that is part of the coupling.

The main differences between the modification shown in FIGS. 31-35 and the other structures are; (1) the structure is simpler, lighter in weight, more quickly installed and removed, and (2) the pulling stress is concentrated at the chassis level as opposed to the "over the top" ball connection. In other words, the towing force is in a direct line from the chassis, rather than a radial stress.

Vertical adjustment of the assembly for roof clearance is readily made as each sleeve 170 is telescopically supported in each leg 168 and is secured at its adjusted height by a bolt 196 extending through registering openings in the sleeve and leg. By this structure the assembly may be adjusted for use on vehicles of different roof heights.

I claim:

1. A straddle trailer hitch assembly for connecting a trailer having forwardly directed elevated tongue with a tow vehicle of the type that includes a chassis having front and rear ends and front and rear ground wheels adjacent said front and rear ends and a body on said chassis, comprising:
   a. a hitch element for releasable connection with said tongue;
   b. a frame for supporting said hitch element on said chassis in a trailer towing position spaced above said body located centrally relative to the lateral sides of said body and at a point intermediate said front and rear ends;
   c. securing means for releasably securing said frame to such chassis with said hitch element in said towing position;
   d. said frame including a cross member of a length for extending transversely across the top of said body from side-to-side of the latter, with said hitch element rigid on said cross member centrally between the ends of the latter, and rigid members connected with said cross member extending downwardly therefrom having said securing means at the lower ends thereof when said hitch element is in said trailer towing position;
   e. said rigid members comprising a pair of struts having forward end portions connected with the ends of said cross member, said struts extending longitudinally of said chassis and downwardly to the rear ends of the latter adjacent the rear end of said body when said hitch element is in said trailer towing position, and said rigid members including vertically extending legs connected with said struts adjacent their forward ends extending across opposite sides of said body to opposite sides of said chassis at their lower ends when said hitch element is in said trailer towing position.

2. In an assembly as defined in claim 1:
   f. a horizontally extending stiffener member extending between and connecting the rear end portions of said pair of struts;
   g. means on said frame supporting said stiffener member for movement from a lowered position spaced below the tongue on said trailer when such tongue is connected with said hitch element, to an elevated position in engagement with the underside of said tongue for holding said assembly and trailer stable relative to each other when said tongue is disconnected from said tow vehicle and said frame is supported on the ground; and
   h. supports on said frame movable to a downwardly extended position for so supporting said frame on the ground.

3. In an assembly as defined in claim 1:
   f. means for supporting said legs and said struts on said chassis different distances apart; and
   g. connecting means for connecting the ends of said cross bars to said legs at each of said distances and for supporting said cross bar at different heights relative to said legs whereby said frame will be adapted for securement on a chassis having a body thereon of different heights and widths.

4. A straddle trailer hitch assembly for connecting a trailer having forwardly directed elevated tongue with a tow vehicle of the type that includes a chassis having front and rear ends and front and rear ground wheels adjacent said front and rear ends and a body on said chassis, comprising:
   a. a hitch element of releasable connection with said tongue;
   b. a frame for supporting said hitch element on said chassis in a trailer towing position spaced above said body located centrally relative to the lateral sides of said body and at a point intermediate said front and rear ends;
   c. securing means for releasably securing said frame to such chassis with said hitch element in said towing position;
   d. frame-supporting means carried by said frame and supported thereon for downward movement from a retracted upper position when said frame is secured on said chassis for movement over the ground, to a downward extended position in engagement with the ground for supporting said frame stable on the ground when said assembly is disconnected from said tongue and is released from said chassis, and means on said frame supporting said frame-supporting means for said downward movement and for movement back to said upper position;
   e. said frame including a pair of forward vertically extending legs and a horizontally extending cross member connected with the upper ends of said legs said legs being spaced apart to straddle the body of said tow vehicle when said hitch unit is in said trailer towing position;
   f. said frame supporting means including a vertically extensible jack carried by each of said legs at its lower end.

5. In an assembly as defined in claim 4:
   g. said legs being tubular, and each of said jacks being supported within the lower end of each leg.

6. A straddle trailer hitch assembly for connecting a trailer having forwardly directed elevated tongue with a tow vehicle of the type that includes a chassis having front and rear ends and front and rear ground wheels adjacent said front and rear ends and a body on said chassis, comprising:
   a. a hitch element for releasable connection with said tongue;
   b. a frame for supporting said hitch element on said chassis in a trailer towing position spaced above said body located centrally relative to the lateral sides of said body and at a point intermediate said front and rear ends;

c. securing means for releasably securing said frame to such chassis with said hitch element in said towing position;
d. said frame including a cross member of a length for extending transversely across the top of said body from side-to-side of the latter, with said hitch element rigid on said cross member centrally between the ends of the latter, and rigid members connected with said cross member extending downwardly therefrom having said securing means at the lower ends thereof when said hitch element is in said trailer towing position;
e. said securing means comprising chassis elements to be rigidly secured to said chassis at opposite sides of the latter, and locking elements movably supported on said rigid members at their lower ends for movement into and out of securing engagement with said chassis elements when the latter are rigidly secured to said chassis;
f. said rigid members being spaced for receiving said body of a tow car therebetween with the lower ends of said rigid members adjacent and outwardly of the lateral sides of said chassis;
g. said chassis elements comprising a pair of nuts having threaded bores;
h. means for rigidly securing said units to said chassis adjacent opposite sides thereof with their bores horizontal and coaxial;
i. coaxial horizontally extending bolts at the lower ends of said rigid members for threadedly engaging the threads of said nuts for releasably securing said rigid members to said chassis when said nuts are rigidly secured to said chassis.

7. In an assembly as defined in claim 6:
j. guide means for guiding said bolts to said bores from the opposite outer sides of said chassis.

8. In combination with a tow vehicle and a trailer, which tow vehicle is of the type that includes a chassis having front and rear ends and a body thereon extending from end to end of said chassis, and which trailer has a tongue extending forwardly to a hitch point over said body substantially centrally between the sides and intermediate the front and rear ends of said chassis:
a. a hitch element in a towing position at said hitch point connected with said tongue for universal pivotal movement of said tongue and body relative to each other at said hitch point;
b. a frame supported on and releasably connected with said chassis supporting said hitch element in said towing position;
c. securing means releasably securing said frame to said chassis in a position spaced from said body whereby the towing forces and strains incident to towing said trailer will all be transmitted to said chassis independently of said body;
d. vertically extensible and retractable frame supporting means on said frame actuatable for downward extension to support said frame on the ground when said frame is disconnected from said tow vehicle, and for upward retraction when said frame is connected with said tow vehicle for towing said trailer; and
e. means for releasably holding said frame supporting means downwardly extended and for holding said frame supporting means in upward retracted position;
f. stabilizing means on said frame supported for upward movement into engagement with said tongue prior to releasing said trailer from said frame, for supporting said frame stable against movement relative to said trailer and tongue upon moving said frame supporting means to positions supporting said frame on the ground and releasing said securing means separating said towing vehicle from said frame.

9. In combination with a tow vehicle and a trailer, which tow vehicle is of the type that includes a chassis having front and rear ends and a body thereon extending from end to end of said chassis, and which trailer has a tongue extending forwardly to a hitch point over said body substantially centrally between the sides and intermediate the front and rear ends of said chassis:
a. a hitch element in a towing position at said hitch point connected with said tongue for universal pivotal movement of said tongue and body relative to each other at said hitch point;
b. a frame supported on and releasably connected with said chassis supporting said hitch element in said towing position;
c. said frame comprising a generally inverted U-shaped yoke providing a pair of legs straddling said body and chassis intermediate the ends of said chassis, and a cross member extending between and connecting the upper ends of said legs, and horizontally elongated struts connected at one of their ends with said member adjacent the upper ends of said legs and terminating at their other ends adjacent the rear end of said chassis;
d. said struts including tubular vertically extending rear end portions and said legs being tubular;
e. supports vertically reciprocable within said legs and said rear end portions for movement from an elevated position spaced above the ground to a lowered position for supporting said frame on the ground when in said lowered position; and
f. means on said legs and rear end portions for holding said supports in said elevated position and in said lowered position.

10. A straddle trailer hitch assembly for connecting a trailer having forwardly directed elevated tongue with a tow vehicle of the type that includes a chassis having front and rear ends and front and rear ground wheels adjacent said front and rear ends and a body on said chassis, comprising:
a. a hitch element for releasable connection with said tongue;
b. a frame for supporting said hitch element on said chassis in a trailer towing position spaced above said body located centrally relative to the lateral sides of said body and at a point intermediate said front and rear ends;
c. securing means for releasably securing said frame to such chassis with said hitch element in said towing position;
d. said frame including a horizontally extending cross member adapted to extend transversely across said tow vehicle at a point spaced between the front and rear ends of said chassis, and legs connected with said cross member spaced apart for extending downwardly across and spaced outwardly of opposite sides of said tow vehicle for securement to said chassis at their lower ends of supporting said cross member spaced above said tow vehicle;

e. means for securing said hitch element to said cross member centrally between the ends of the latter;

f. separate means for supporting said cross member at different heights above said chassis and for supporting said legs different distances apart to position said cross member and legs on tow vehicles of different heights and widths.

11. A straddle trailer hitch assembly for connecting a trailer having forwardly directed elevated tongue with a tow vehicle of the type that includes a chassis having front and rear ends and front and rear ground wheels adjacent said front and rear ends and a body on said chassis, comprising:

a. a hitch element for releasable connection with said tongue;

b. a frame for supporting said hitch element on said chassis in a trailer towing position spaced above said body located centrally relative to the lateral sides of said body and at a point intermediate said front and rear ends;

c. securing means for releasably securing said frame to said chassis in a position in which said frame is spaced from said body whereby the towing forces and strains incident to towing said trailer will all be transmitted to said chassis independently of said body, and said securing means being outside said body and accessible to an operator on the ground at each of the opposite sides of said chassis when said frame is being secured on or removed from said chassis;

d. said frame including a pair of generally horizontally extending struts having forward ends connected with said legs at points spaced between the upper and lower ends of the latter and extending rearwardly and downwardly from said points along and spaced laterally outwardly of opposite sides of said body and terminating in rear ends adjacent the rear end of said chassis when said frame is in a position supporting said hitch element in towing position connected with said chassis.

12. In the assembly as defined in claim 11:

g. said points of connection between the forward ends of said struts and said legs being closer to the lower ends of said legs than to the upper ends.

13. In the assembly as defined in claim 11:

g. a horizontally extending cross bar connected at its ends with the rear ends of said struts, said cross bar being free from rigid securement to said chassis when said frame is connected with the latter in towing position.

14. In the assembly as defined in claim 11:

g. said cross member and said legs being in a substantially vertical plane when said frame is in towing position;

h. said securing means including anchor members adapted to be rigidly secured to and supported on said chassis in a position spaced forwardly of said plane;

i. leg positioning and supporting means rigid with said legs projecting forwardly of their lower ends, and said securing means including bolts for releasably securing the forward ends of said leg positioning and supporting means to said anchor members when the latter are secured on said chassis forwardly of said plane whereby said legs will be spaced rearwardly of said anchor means and bolts; and j. means for securing said anchor members to said chassis forwardly of said plane.

15. In the assembly as defined in claim 11:

g. strut-supported means connected with and carried by said struts in a position spaced between the rear ends of the latter, and chassis-supported means adapted to be secured to and carried by said chassis adjacent the rear end of the latter in a position for movement into releasable engagement with said strut-supported means when said chassis-supported means is secured on said chassis adjacent the rear end of the latter and upon rearward movement of said tow vehicle from a position forwardly of said frame to a position centrally between said legs in towing position, and means for securing said chassis-supported means on said chassis adjacent the rear end of the latter;

h. said strut-supported means and said chassis-supported means including members on said strut-supported means and elements on said chassis-supported means in said releasable engagement when said frame is secured to said chassis in towing position holding said rear ends of said struts against vertical, lateral and forward movement relative to said chassis.

16. In the assembly as defined in claim 15:

i. said strut-supporting means including a horizontally extending cross bar having its ends below the rear ends of said struts, with said members of said strut-supporting maeans being secured on said cross bar; and j. means adjustably supporting said cross bar suspended from said rear ends of said struts for positioning said cross bar at different distances below said rear ends to position said members of said strut-supported means for said engagement with the elements of said chassis-supported means.

17. A straddle trailer hitch assembly for connecting a trailer having a forwardly directed elevated tongue with a tow vehicle of the type that includes a chassis having front and rear ends and front and rear ground wheels adjacent said front and rear ends and a body on said chassis, comprising:

a. a hitch element for releasable connection with said tongue;

b. a frame for supporting said hitch element on said chassis in a towing position spaced above said body located centrally relative to the lateral sides of said body at a point intermediate said front and rear ends;

c. securing means for releasably securing said frame to such chassis with said hitch element in said towing position;

d. said frame including a horizontally extending cross member adapted to extend transversely across said tow vehicle at a point spaced between the front and rear ends of said chassis, and legs connected with said cross member spaced apart for extending downwardly across and spaced outwardly of opposite sides of said tow vehicle for securement to said chassis at their lower ends for supporting said cross member spaced above said tow vehicle;

e. means for securing said hitch element to said cross member centrally between the ends of the latter;

f. said frame including a pair of horizontally elongated struts having forward ends secured to said legs and extending rearwardly from said legs along and spaced outwardly of opposite sides of said body, and terminating in rear ends adjacent the rear end of said chassis;

g. separate means respectively rigidly connected with said struts positioned intermediate their rear ends, and with the rear end of said chassis free from rigid securement to each other in releasable engagement with each other for holding said rear ends of said struts and said rear end of said chassis against substantial vertical and lateral movement relative to each other;

h. said securing means including releasable elements for securing the lower ends of said legs to said chassis, and said separate means being separable from each other and said tow vehicle being free for forward movement away from said frame and trailer upon release of said elements.

18. In the combination as defined in claim 17:

i. said separate means each including guide surfaces for guiding the other to holding relation upon rearward movement of the tow vehicle from a position spaced forwardly of said frame to a position substantially centrally between said wheels to towing position.

19. In combination with a tow vehicle of the type having a horizontally elongated chassis provided with front and rear ground wheels having a closed body provided with side doors sprung on said chassis and extending from end to end of the latter, and a trailer of the type having a tongue extending forwardly to a hitch point over said body substantially centrally between its sides and intermediate the front and rear ends of said chassis:

a. a hitch element in a towing position at said hitch point connected with said tongue for universal pivotal movement of said tongue and body relative to each other at said hitch point;

b. a frame supported on and releasably connected with said chassis supporting said hitch element in said towing position;

c. said frame comprising a generally inverted U-shaped yoke providing a pair of legs at opposite sides of said body and chassis intermediate the ends of said chassis, and a cross member extending over and spaced above said body secured at its ends to the upper ends of said legs, and elongated struts connected at one of their ends with said legs at points spaced below the said cross bar and outwardly of opposite sides of said body, said struts extending rearwardly along and spaced laterally outwardly of the sides of said body below the level of the top of said body to points adjacent the terminating rear ends of said body and chassis;

d. said hitch element being positioned centrally between the ends of said cross members; and e. means for supporting said legs on said chassis in positions rearwardly of the rearmost side doors on said body.

20. A straddle trailer hitch assembly for connecting a forwardly directed elevated tongue with a tow vehicle of the type that includes a chassis having front and rear ends and front and rear ground wheels adjacent said front and rear ends and a body on said chassis, comprising:

a. a hitch element for releasable connection with said tongue;

b. a frame for supporting said hitch element on said chassis in a trailer towing position spaced above said body located centrally relative to the lateral sides of said body and at a point intermediate said front and rear ends;

c. securing means for releasable securing said frame to such chassis with said hitch element in said towing position;

d. said frame including a horizontally extending cross member adapted to extend across said tow vehicle at a point spaced between the front and rear ends of said chassis, and legs connected with said cross member spaced apart for extending downwardly across and spaced outwardly of opposite sides of said tow vehicle for securement to said chassis at their lower ends for supporting said cross member spaced above said tow vehicle;

e. means for securing said hitch element to said cross member centrally between the ends of the latter;

f. means for supporting said cross member at different heights relative to said legs to position said frame on tow vehicles having different body heights.

21. In the assembly as defined in claim 20:

g. said hitch element comprising a vertically elongated pivot and a horizontally elongated pivot supported on said cross member with their axes in intersecting relation at a right angle to each other with said horizontally elongated pivot extending transversely relative to said cross member for connecting said cross member with said tongue and to provide for lateral rocking movement between said tow vehicle and said tongue, and said vertically elongated pivot being adapted to connect said cross member with said tongue for providing turning movement of said tow vehicle relative to said tongue about the vertical axis of said last mentioned pivot.

22. In the assembly as defined in claim 21:

h. said securing means including a connection for pivotally supporting said frame on said chassis for rocking movement of said chassis about a horizontal axis at a right angle to the length of said tow vehicle when said frame is secured on said chassis and is secured to said tongue.

* * * * *